(12) United States Patent
Friese et al.

(10) Patent No.: US 12,121,863 B2
(45) Date of Patent: Oct. 22, 2024

(54) DISPOSABLE FILTER CAPSULE FOR A FILTRATION DEVICE

(71) Applicant: SARTORIUS STEDIM BIOTECH GMBH, Goettingen (DE)

(72) Inventors: Thomas Friese, Bleicherode (DE); Thomas Loewe, Goettingen (DE); Ralf Lausch, Goettingen (DE); Sebastian Handt, Goettingen (DE); Paschalis Nikoloudis, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 247 days.

(21) Appl. No.: 16/633,643

(22) PCT Filed: Jul. 18, 2018

(86) PCT No.: PCT/EP2018/069545
§ 371 (c)(1),
(2) Date: Jan. 24, 2020

(87) PCT Pub. No.: WO2019/020467
PCT Pub. Date: Jan. 31, 2019

(65) Prior Publication Data
US 2020/0164289 A1 May 28, 2020

(30) Foreign Application Priority Data
Jul. 26, 2017 (DE) ..................... 10 2017 116 923.7

(51) Int. Cl.
*B01D 27/14* (2006.01)
*B01D 35/30* (2006.01)
*B01D 63/06* (2006.01)

(52) U.S. Cl.
CPC ........... *B01D 63/06* (2013.01); *B01D 27/142* (2013.01); *B01D 27/148* (2013.01);
(Continued)

(58) Field of Classification Search
CPC .. B01D 27/148; B01D 27/142; B01D 35/303; B01D 2201/4023; B01D 2257/91;
(Continued)

(56) References Cited

U.S. PATENT DOCUMENTS

| 5,328,609 A * | 7/1994 | Magnusson ............. C02F 1/003 210/295 |
| 2005/0035048 A1 * | 2/2005 | Chancellor ............ B01D 63/12 210/321.89 |

(Continued)

FOREIGN PATENT DOCUMENTS

| DE | 19848389 C2 | 6/2002 |
| DE | 10239241 A1 | 3/2004 |

(Continued)

OTHER PUBLICATIONS

International Search Report, Application No. PCT/EP2018/069545, Mailing Date: Oct. 2, 2018, 3 pages.

*Primary Examiner* — Madeline Gonzalez
(74) *Attorney, Agent, or Firm* — Dilworth IP, LLC

(57) ABSTRACT

A disposable filter capsule for a filtration device comprises only one housing, which has an inflow connection for a fluid to be filtered and an outflow connection for filtrate. The disposable filter capsule also comprises at least two separate filter means, which are fixed in the housing and together with the housing form an inseparable structural unit. All the components of the disposable filter capsule consist of sterilizable, in particular gamma-sterilizable, materials.

16 Claims, 4 Drawing Sheets

(52) U.S. Cl.
CPC .... *B01D 35/303* (2013.01); *B01D 2201/4023* (2013.01); *B01D 2257/91* (2013.01)

(58) Field of Classification Search
CPC ............ B01D 2319/02; B01D 2319/06; B01D 63/06; B01D 27/146; B01D 61/18
USPC ....... 210/295, 314, 315, 342, 335, 337, 338, 210/439, 446, 120, 180, 436, 472
See application file for complete search history.

(56) References Cited

U.S. PATENT DOCUMENTS

| | | | |
|---|---|---|---|
| 2005/0279695 | A1 | 12/2005 | Straeffer et al. |
| 2007/0034564 | A1* | 2/2007 | Clendenning ........ B01D 29/353 210/493.1 |
| 2013/0327691 | A1* | 12/2013 | Burbank ............. A61M 1/1656 210/252 |

FOREIGN PATENT DOCUMENTS

| | | | |
|---|---|---|---|
| EP | 0166325 | A2 | 1/1986 |
| EP | 0508645 | A2 | 10/1992 |
| EP | 1987869 | A1 | 11/2008 |
| GB | 189411090 | A | 4/1895 |
| GB | 2035832 | A | 6/1980 |
| WO | 2014040669 | A1 | 3/2014 |
| WO | 2017032560 | A1 | 3/2017 |

* cited by examiner

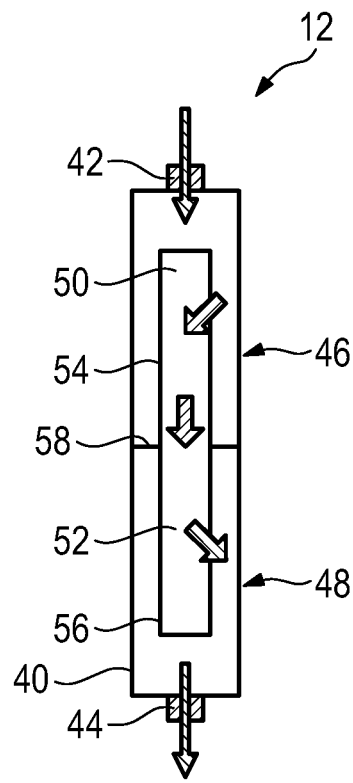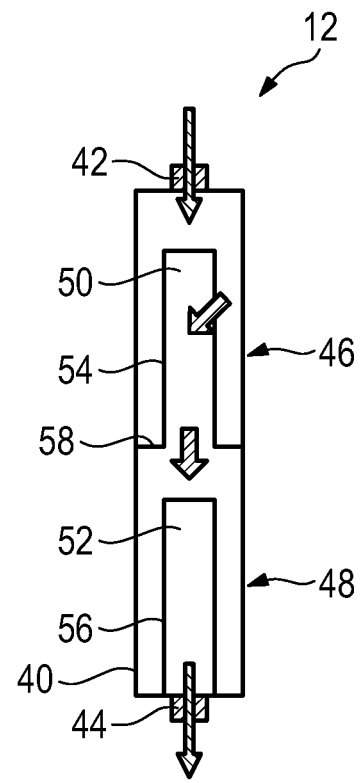
Fig. 1　　　　　Fig. 2
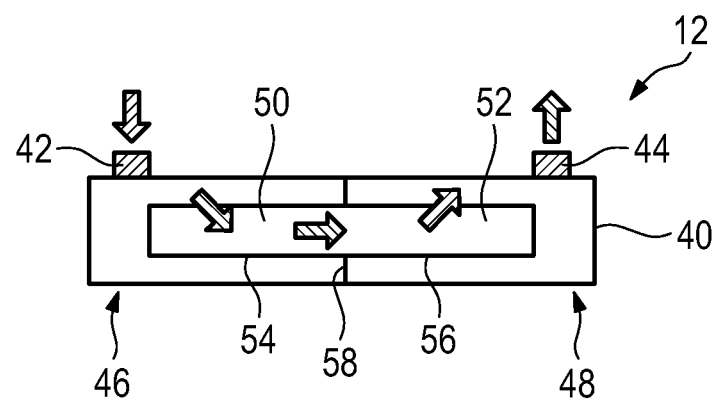
Fig. 3

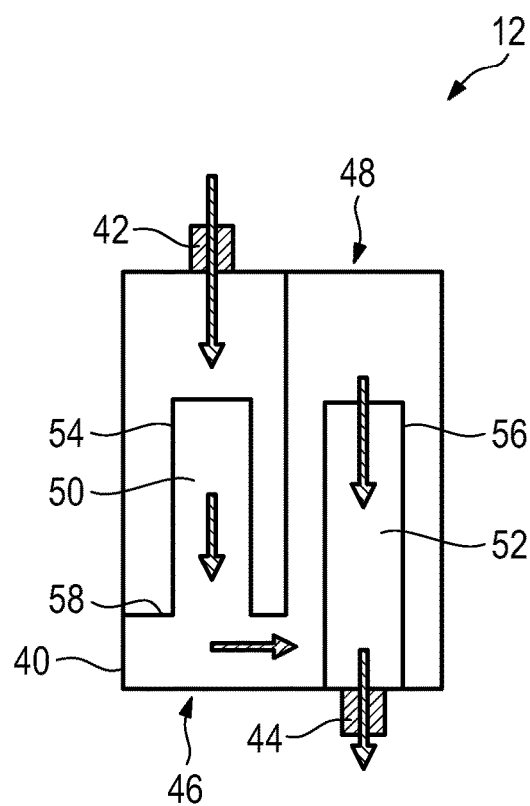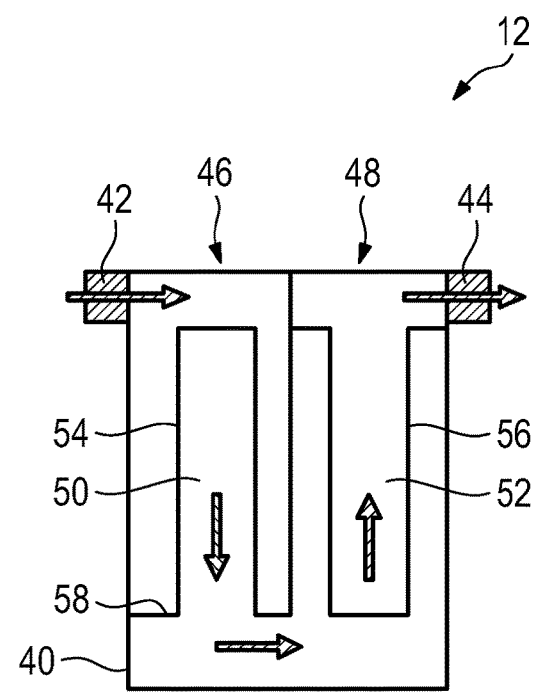
Fig. 4
Fig. 5

DISPOSABLE FILTER CAPSULE FOR A FILTRATION DEVICE

FIELD OF THE INVENTION

The invention relates to a disposable filter capsule for a filtration device.

BACKGROUND OF THE INVENTION

It is known from separation technology that filter cartridges are usually installed as components in housings having suitable fluid connections. In particular in the field of single-use applications, such units are generally referred to as filter capsules. However, the term "filter capsules" is here not intended to be restrictive, but is to be understood in general terms, and is intended to designate any independently mountable assembly having a filter medium.

Filter capsules are used, among others, in sterile filtration processes in the biopharmaceutical sector. Document WO 2017/032560 A1 discloses a fully pre-sterilizable, integrity-testable disposable filtration device which is ready for connection and which is designed for large-volume filtration processes. This disposable filtration device comprises a plurality of standard sized disposable filter capsules which are connected to each other by lines and are supported by a rigid support.

Typically, such a filtration device is equipped with a plurality of filter capsules of the same type in a given size. This limits the choice of feasible filtration processes. Even if different filter capsules are used, there are still certain limitations due to the limited number of filter capsules that can be used in a device.

A capsule for the filtration of fluids which is composed of two housing parts is known from document DE 198 48 389 C2. One of the housing parts houses a filter cartridge serving as a pre-filter. This housing part is detachable and is adapted to be disposed of separately. The other reusable housing part houses a sterile end filter that is adapted to be tested for integrity and is also designed as a filter cartridge. The housing part including the pre-filter has an axial connection to the inlet for a fluid to be filtered, which is in flow connection with a fluid-permeable core tube of the pre-filter. The pre-filter cartridge is closed on the end face opposite the inlet. The housing part including the end filter has an axial connection to the outlet for filtrate, which is in flow connection with a fluid-permeable core tube of the end filter. The end filter cartridge is closed on the end face opposite the outlet, i.e. the closed end faces of the pre-filter and of the end filter are opposite each other. The fluid to be filtered passes from the inlet into the core tube of the pre-filter, which is closed on one side, passes through the pre-filter cartridge to the outside and enters an outer space formed between the two filter cartridges and the housing wall. From there, the fluid passes through the end filter cartridge to the inside into the core tube thereof and flows from here through the outlet out of the capsule.

Document DE 102 39 241 A1 describes a filter device for fluids having a stainless steel housing, which has an intake for the fluid to be filtered and an outlet for the filtrate, and a filter unit assembled in a modular fashion from at least two so-called filter elements. The filter elements are so-called jumbo filter cartridges which have a diameter of almost 30 cm. The filter elements of identical construction each include a filter element having an inner hollow support core and a filter layer arranged thereon, the inner support core being formed in one piece with a first end plate and a second end plate. The filter elements are detachably joined together by inserting a connecting pipe of one filter element into a seat of the other filter element and by locking it in place, thereby also establishing a fluid connection between the supporting cores of the two filter elements. The individual filter elements are thus flowed through in parallel. The outlet of the housing is fluidically connected to a housing-side seat into which the connecting pipe of the last filter element is inserted to create a fluid connection between the housing outlet and the support cores of the filter elements.

SUMMARY OF THE INVENTION

The object of the invention is to overcome the aforementioned limitations and to permit more efficient filtration processes which are adapted to be designed in a more flexible manner with as little assembly effort as possible.

This object is achieved by a disposable filter capsule having the features of claim 1. Advantageous and practical configurations of the disposable filter capsule according to the invention are specified in the subclaims.

The disposable filter capsule according to the invention for a filtration device comprises one single housing which has an inflow connection for a fluid to be filtered and an outflow connection for filtrate. The disposable filter capsule further comprises at least two, preferably separate filter means which are firmly mounted within the housing and form an inseparable structural unit together therewith. All components of the disposable filter capsule consist of sterilizable, in particular gamma-sterilizable materials. Alternatively, sterilization can also be carried out by means of superheated steam or autoclave treatment.

The disposable filter capsule according to the invention is particularly preferably a liquid filter capsule with hydrophilic filter material.

Separate filter means are to be understood as spatially separated filter means which are mounted in the same filter capsule housing, but which could in principle also be used as independent filter means. In particular, a filter means within the meaning of the invention comprises at least one filter medium and a means supporting or stabilizing the form of the filter medium.

An essential aspect of the invention is the design of the filter capsules according to the invention as disposable filter capsules. Filter cartridges or hollow fiber elements in particular are considered as filter means in the filter capsule, without this being regarded as a restriction. According to the invention, the filter means and the housing including the connections are designed as a disposable unit and can be disposed of as a whole after a single use.

Here, a housing is understood to be a complete outer housing of the filter capsule according to the invention which surrounds all components of the filter capsule, i.e. not only part of a housing or an inner housing or the like. According to the invention, the filter means are firmly mounted within the housing and form an inseparable structural unit therewith. Irrespective of the fact that each unit can be separated with a sufficient effect of force, this means within the meaning of the invention that opening or disassembling the housing and replacing a filter means are not provided for the intended use of the filter capsule.

The invention is based on the knowledge that a preassembled disposable filter capsule which is ready for use and ready for connection and has at least two filter means in the same housing offers numerous advantages. Thus, the invention opens up the possibility of carrying out a combination filtration within a single filter capsule and thus—compared to two separate filter capsules with only one filter means each—in an extremely space-saving manner. Depending on the user's wishes and requirements, various filter constellations can be realized. For example, a pre-filtration and then a sterile filtration or a redundant sterile filtration or stepwise filtration can be carried out in the filter capsule according to the invention. The preassembling as an inseparable unit saves any effort on the part of the user prior to commissioning (assembly, inspection, etc.). On the other hand, the preassembling as an inseparable unit permits a compact, material-saving design without internal connection components and therefore with extremely low dead volumes. Since hoses, clamps and the like can be completely dispensed with in favor of internal rigid flow connections, even high test pressures do not pose a fundamental problem for the filter capsule according to the invention with regard to leakage risks etc. The pressure stability of the filter capsule according to the invention is still given even after various sterilization methods (for example autoclave treatment and irradiation).

The design of the disposable filter capsule according to the invention with several separate filter means which are firmly mounted within a housing to form an inseparable structural unit thus provides a compact All-in-One solution which is adapted to be delivered completely pre-sterilized and to be disposed of as a whole after use, wherein less waste is produced compared to other solutions with several individual filter means which are connected to each other by hose lines.

In addition, the filter capsule according to the invention surprisingly shows performance advantages over other solutions with multiple filter means, in particular in terms of service life, i.e. a higher volume can be filtered until the filter blocks. Usually, a combination filtration system, for example, having two filter means in separate housings—if carried out optimally—achieves at best the service life of the pre-filter. Also a combination pleating, e.g. all filters joined and pleated together or several pleated filters within one filter cartridge, fall behind with regard to service life.

With regard to the clarification effect (turbidity), the filter capsule according to the invention, when equipped with a pre-filter and a sterile filter in the same housing, shows a significantly better performance than the alternative solutions mentioned (up to 30% and more).

According to a particular aspect of the invention, the filter means in the filter capsule are connected in series. The main objective of the invention is a sequential flow through two filter means within the same housing in order to fully exploit the above-mentioned advantages.

Depending on the installation situation, the inflow connection and the outflow connection of the filter capsule may advantageously be provided at opposite front ends of the housing or at a side wall of the housing. Here, a side wall is understood to be a wall running substantially parallel to the longitudinal directions of the filter means.

A preferred way of arranging filter means having a substantially cylindrical shape in the common housing is to arrange the filter means one on top of the other in the axial direction.

However, it is also possible to arrange the filter means substantially parallel next to each other. This corresponds to a cassette-like structure.

Filter cartridges each having a hollow core area surrounded by a filter medium and an outer area formed between the filter medium and the housing are suitable as filter means for many applications of the filter capsule according to the invention.

Preferably, the filter capsule is connected in such a way that the inflow connection thereof is in direct flow connection with the outer area of a first filter means. The first filter means (filter cartridge) is then flowed through from the outside through the filter medium into the core area.

The outflow connection of the filter capsule may be in direct flow communication with either the outer area or the core area of a second filter means.

In any case, the outer areas of the filter means should be fluidically separated from each other by a barrier to ensure a desired sequential flow path (without "short circuit").

According to a first alternative, the core areas of the filter means are in direct flow connection with each other. In this case, the first filter means is flowed through from the outer area to the core area and the second filter means is flowed through from the core area to the outer area.

According to a second alternative, the core area of a first filter means is in direct flow communication with the outer area of a second filter means. In this case, the first filter means is flowed through from the outer area to the core area and the second filter means is also flowed through from the outer area to the core area.

All filter means in the filter capsule are configured as sterile filters for a redundant sterile filtration within the filter capsule according to the invention.

For a combined pre-filtration and sterile filtration within the filter capsule according to the invention, at least one first filter means is configured as a pre-filter and at least one second filter means is configured as a sterile filter or as a virus filter.

For carrying out a stepwise filtration or for specific other applications, it is provided that the filter means differ from each other with regard to at least one parameter characteristic of the filter means. Such parameters are, for example, the pore size of the filter medium, the effective filter area, the filter material, the size, in particular the height, the design, the geometry, etc.

In a particular embodiment, the filter means of the disposable filter capsules differ in their type. It is for example possible to combine a filter cartridge in combination with a hollow fiber element in one housing.

According to a further preferred embodiment, at least three filter means, preferably at least four filter means are firmly mounted within the housing of the filter capsule according to the invention. Preferably, all filter means mounted in the filter capsule differ from each other with regard to a characteristic parameter, for example the pore size. This permits a particularly effective cascade-type filtration.

In particular, at least three filter means can be firmly mounted within the housing of the filter capsule according to the invention, at least two of these filter means being connected in parallel and at least one of the filter means being connected in series therebehind.

At least one vent valve may be attached to each of the filter capsules according to the invention.

According to a preferred application of the invention, at least one, preferably at least two filter capsules according to the invention are integrated into a completely pre-sterilizable, integrity-testable disposable filtration device which is ready for connection.

BRIEF DESCRIPTION OF THE DRAWINGS

Further features and advantages of the invention will become apparent from the following description and from the accompanying drawings to which reference is made. In the drawings:

FIG. 1 shows a schematic sectional view of a first embodiment of the filter capsule according to the invention;

FIG. 2 shows a schematic sectional view of a second embodiment of the filter capsule according to the invention;

FIG. 3 shows a schematic sectional view of a third embodiment of the filter capsule according to the invention;

FIG. 4 shows a schematic sectional view of a fourth embodiment of the filter capsule according to the invention; and FIG. 5 shows a schematic sectional view of a fifth embodiment of the filter capsule according to the invention;

DESCRIPTION OF THE INVENTION

Figure 6:
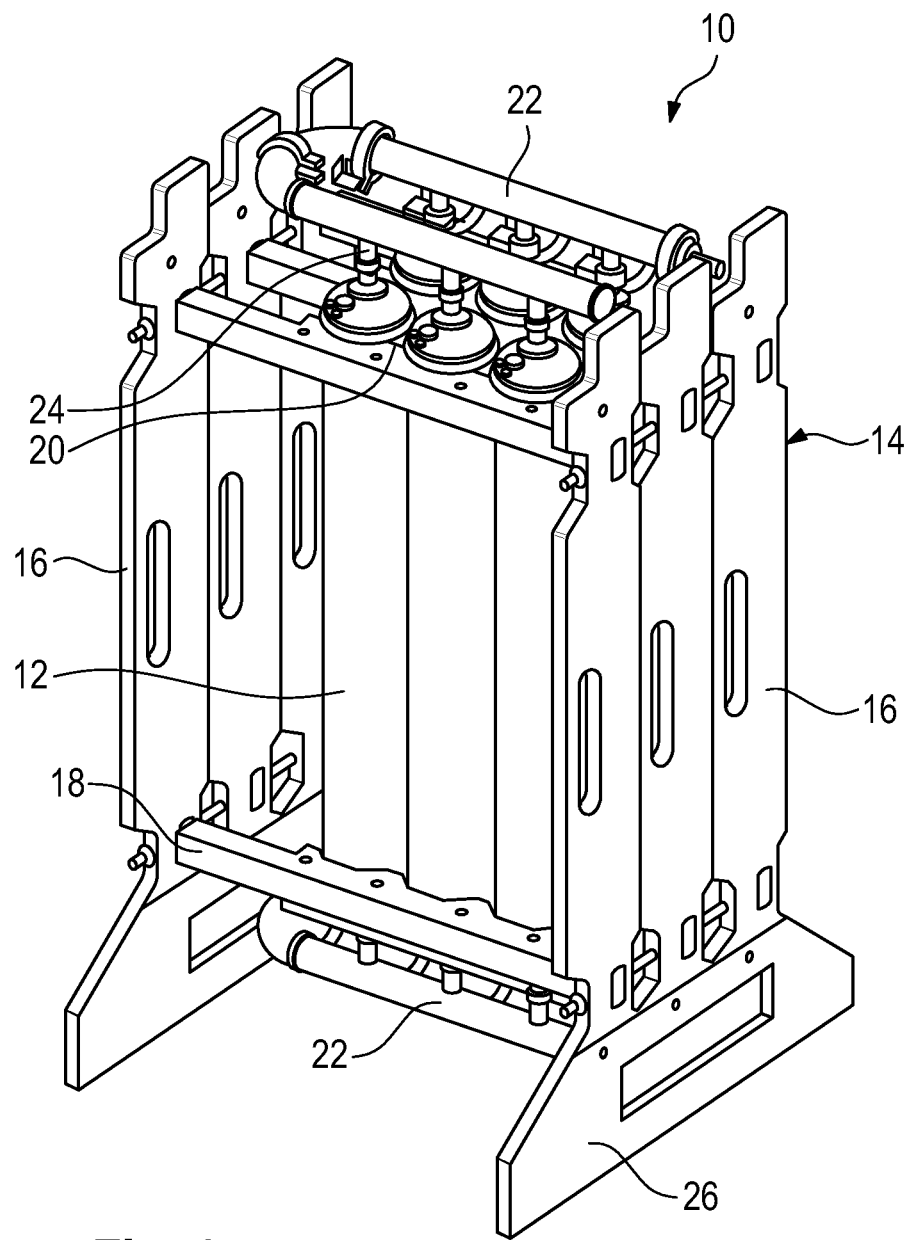
FIG. 6 shows a perspective view of a disposable filtration device according to the invention having a plurality of disposable filter capsules according to the invention.

FIG. 1 shows a first embodiment of a liquid filter capsule 12 which can be used in a disposable filtration device 10 as shown in FIG. 6 or in another filtration device. The filter capsule 12 consists substantially of an elongated housing 40 having an inflow connection 42 to the inlet of the fluid to be filtered and an outflow connection 44 for the filtrate. The inflow connection 42 and the outflow connection 44 are provided here at opposite front ends of the housing 40. The inflow connection 42 and the outflow connection 44 can be identical or different.

The filter capsule 12 is usually mounted in a filtration device in an upright position, as shown in FIG. 1. However, an operation in a horizontal position, i.e. rotated by 90° against the longitudinal direction, or in any other angular position is in principle also possible.

The housing 40 accommodates two separate filter means 46, 48 in the form of filter cartridges each having a hollow core area 50 or 52 and a filter medium 54 or 56 surrounding the latter, which is typically pleated and, if necessary, may comprise several layers. The two filter means 46, 48 are arranged one on top of the other such that the first filter means 46 faces the inflow connection 42 and the second filter means 48 faces the outflow connection 44.

The filter means 46, 48 may generally be assembled by welding, clamping, screwing or in any other suitable manner and can be fastened in the housing 40. These are filter means which could in principle also be used alone as an independent filter means in a conventional filter capsule.

The two core areas 50, 52 of the filter means 46, 48 are in direct flow connection with each other, i.e. there is no filter medium or other obstacle between the two core areas 50, 52. On the other hand, none of the two core areas 50, 52 is in direct flow connection with the inflow connection 42 or the outflow connection 44. In addition, the two filter means 46, 48 are fluidically separated from each other outside their core areas 50, 52 by a barrier 58.

Due to the barrier 58, the following flow path through the filter capsule 12 is necessarily obtained: The fluid entering the outer area of the first filter means 46 via the inflow connection 42 passes through the filter medium 54 into the core area 50 of the first filter means 46. From there, the fluid can pass unhindered into the core area 52 of the second filter means 48. After passing through the filter medium 56 into the outer area of the second filter means 48, the filtered fluid (filtrate) can exit the filter capsule 12 via the outflow connection 44. The two filter means 46, 48 are thus flowed through one after the other, here however in different directions (in the first filter means 46 from the outer area to the core area 50, in the second filter means 48 however from the core area 52 to the outer area).

The first filter means 46, which is flowed through first, can be configured as a pre-filter, and the second filter means 48 which is then flowed through can be configured as a sterile filter. It is therefore possible to carry out a combined pre-filtration and sterile filtration in the same filter capsule 12. However, it is also possible to configure both filter means 46 and 48 as sterile filters. By sequentially flowing through both filter means 46, 48, a redundant sterile filtration in the same filter capsule 12 is achieved. Other filter types or identical filter types having different parameters can also be combined in the filter capsule 12. It is for example possible to use filter means 46, 48 the filter media 54, 56 of which have different pore sizes in order to realize a graduated filter combination.

The two filter means 46, 48 do not have to be of the same size, but may differ—for example, due to the specific requirements of the filtration process—in particular with regard to length, diameter, filter surface and shape, as long as the above-mentioned flow path within the common housing 40 is ensured.

The filter capsule 12 is a pre-configured assembly which has been completely assembled before delivery and which is ready for connection and ready for service. The housing 40 of the filter capsule 12 does not provide for any opening or detaching of housing parts to replace a filter means, for example. Rather, the filter means 46, 48 accommodated in the housing 40 form an inseparable unit together with housing 40.

The entire filter capsule 12 including the inflow connection 42 and the outflow connection 44 is made of sterilizable, in particular gamma-sterilizable materials and is configured as a disposable filter capsule. This means that the filter capsule 12 is disposed of as a whole after a single intended use.

The second embodiment of the filter capsule 12 shown in FIG. 2 differs from the first embodiment in the arrangement of the filter means 46, 48 and the resulting flow direction through the second filter means 48.

As with the first embodiment, the barrier 58 separates the two outer areas of the filter means 46, 48. In contrast to the first embodiment, after passing through the filter medium 54 into the core area 50 of the first filter means 46, the fluid can pass unhindered into the outer area of the second filter means 48, which is not in flow connection with the outflow connection 44 here. The fluid must therefore flow through the filter medium 56 into the core area 52 of the second filter means 48, which here is in flow connection with the outflow connection 44, so that the filtrate can exit the filter capsule 12.

The two filter devices 46, 48 are thus again flowed through one after the other, but here in the same direction (from the outer area to the core area 50 or 52).

Otherwise, the same applies to the present and the further embodiments of the filter capsule 12 described below as to the first embodiment, in particular with regard to the construction as an inseparable unit, the choice of the filter means 46, 48, the sterilizable materials and the one-way use of the entire filter capsule 12.

The third embodiment of the filter capsule 12 shown in FIG. 3 corresponds for the most part to the first embodiment (FIG. 1). However, the filter capsule 12 is here intended for horizontal use. The inflow connection 42 and the outflow connection 44 are not provided at the opposite front ends of the housing 40, but laterally at the envelope surface of the housing 40. In the mounted position, the inflow connection 42 and the outflow connection 44 preferably point upwards, although other arrangements are also possible, e.g. an inflow connection 42 arranged at the top and an outflow connection 44 arranged at the bottom with respect to the position during operation.

For the embodiments described above, filter cartridges having an outer diameter in the range of about 20 to 170 mm and lengths in the range of about 30 to 270 mm can be used as filter means 46, 48.

FIGS. 4 and 5 show a fourth and a fifth embodiment of the filter capsule 12 the design of which resembles more or is at least similar to a filter cassette. The filter means 46, 48 are here not arranged one on top of each other in the common housing 40, but—in relation to their longitudinal direction—next to each other.

In principle, the flow path in both embodiments is similar to that of the second embodiment (FIG. 2), i.e. from the outer area of the first filter means 46 to the core area 50 thereof, and from there via the outer area of the second filter means 48 to the core area 52 thereof.

As in the second embodiment, the inflow connection 42 is in direct flow connection with the outer area of the first filter means 46 and the outflow connection 44 in in direct flow connection with the core area 52 of the second filter means 48. In the fourth embodiment shown in FIG. 4, the inflow connection 42 and the outflow connection 44 are arranged offset on opposite sides of the common body 40 which face the front ends of the filter means 46, 48. In the fifth embodiment shown in FIG. 5, the inflow connection 42 and the outflow connection 44 are arranged without any offset at the upper end of housing sides which are substantially parallel to the longitudinal directions of the filter means 46, 48.

The invention is not limited to the specifically shown and described embodiments of the filter capsule 12. It is of course possible to combine individual aspects of the various embodiments with each another.

Common to all embodiments of the filter capsule 12 is that at least two filter means 46, 48 are connected one behind the other, i.e. in series. In principle, more than two filter means 46, 48 may also be provided within the housing 40. The flow directions through the individual filter means 46, 48 (from the outer area to the core or vice versa) result from the specific arrangement and design of the filter means 46, 48. They may be the same for all filter means 46, 48 or vary.

In order to be able to subject a filter capsule 12 to an integrity test, a modification of the usual integrity test processes is required. Technically, an integrity test measurement works for each individual segment, i.e. for each filter means 46, 48 separately, provided that graduated filter material pore sizes are present and each segment has a valve connection. The latter is anyway required for venting.

According to a first method, an integrity test is carried out with a suitable testing apparatus indirectly from the inflow connection 42 and stepwise through the individual filter means 46, 48. In one measurement, the so-called bubble point is passed through for each filter means 46, 48 and can be evaluated from the course of the measuring pressure. The diffusion measurement must be controlled in a stepwise manner—again from the inflow connection 42—using a separate test pressure for each filter means 46, 48, with the restriction that each diffusion test pressure must be higher than the bubble point pressure of the upstream filter means 46, 48.

According to a second method, an integrity test measurement is carried out on each filter means 46, 48 individually, the test apparatus being connected via the respective vent valve of the respective filter means 46, 48. This works in accordance with the integrity test procedure commonly used today, provided that the central inlet of the disposable filter capsule 12 is closed so that pressure build-up and tightness are present in the upstream filter means 46, 48. If necessary, the filter means 46, 48 must also be connected to the test apparatus via their vent valves to ensure pressure compensation.

As already mentioned, a preferred application of the filter capsule 12 is the use in a disposable filtration device. FIG. 6 shows an example of such a disposable filtration device 10, which is similar to the device known from document WO 2017/032560 A1. Here, a majority of filter capsules 12 can be held in position in a predetermined arrangement (grid) by a rigid support 14. The support 14 comprises at least two opposite side walls 16 which are connected to each other by transverse struts 18, wherein the side walls 16 can have feet 26. Supporting means 20 for the individual filter capsules 12 are provided on the transverse struts 18.

The filter capsules 12 are completely or at least largely connected to each other by rigid, pressure-stable pipes 22 having a defined diameter. The course of the pipes 22 is determined by the intended operation of the filtration device 10 (parallel or series connection or combination of parallel and series connection of the filter capsules 12), the pipes 22 having the necessary branches 24 to the individual filter capsules 12. In particular, the pipes 22 form either several line branches with associated filter capsules 12, through which the flow passes successively or in parallel, or at least two separate, independent line branches with associated filter capsules 12. If necessary, the pipes 22 are fastened to the support 14. The filter capsules 12 are pre-configured for a desired filtration process, in particular with regard to filter type, design and/or size. The same applies to the arrangement and the course as well as to the connections of the pipes 22.

The essential components of the rigid support 14, the rigid housings of the filter capsules 12 and the rigid pipes 22 are preferably all made of the same material. This material and, where appropriate, other materials used in the device 10 (e.g. for any flexible hoses) are adapted to be sterilized, in particular by gamma-radiation, and are adapted to be treated by autoclave after a single use. The filtration device 10 can thus be packed and sterilized in a pre-assembled condition, i.e. in a condition ready for connection.

Figure 7:
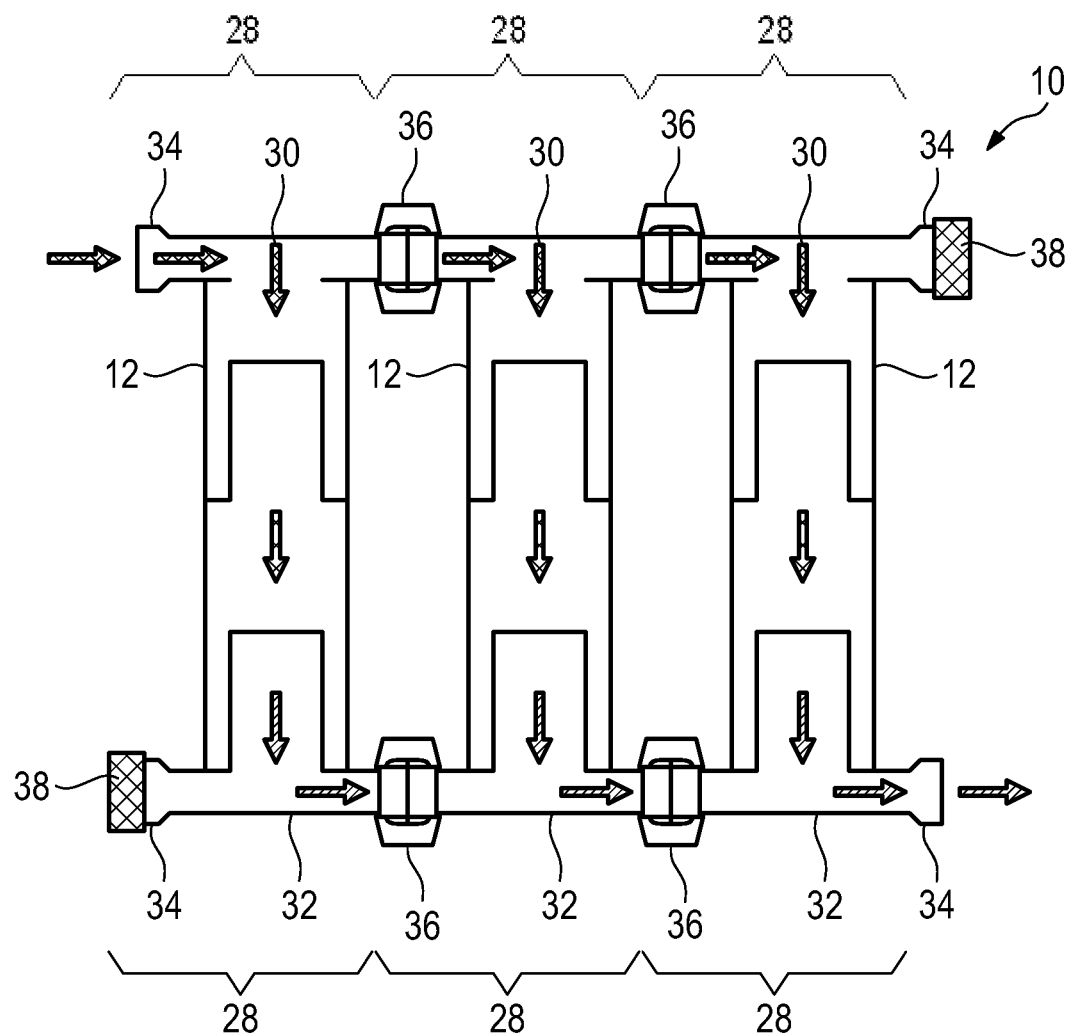
FIG. 7 shows a schematic sectional view of a disposable filtration device according to the invention without support with several disposable filter capsules according to the invention.

FIG. 7 schematically shows a particular embodiment of the disposable filtration device 10 without the support 14. The disposable filtration device 10 is shown here with filter capsules 12, in which two separate filter means are firmly mounted one on top of the other in a housing 40.

Instead of the pipes 22 and branches 24, rigid, standardized inflow and outflow units 28 made of sterilizable, in particular gamma-sterilizable plastic are provided here. For each filter capsule 12, a separate inflow and outflow unit 28 having an inflow means 30 or an outflow means 32 is provided, which are adapted to the front-side inflow and outflow connections of the respective filter capsule 12. The inflow means 30 and the outflow means 32 are either completely identical or at least largely identical in structure. Both the inflow means 30 and the outflow means 32 each have two opposite external connections 34. Several inflow and outflow units 28 can be connected to each other under controlled conditions using suitable connecting components 36, such as TRI-Clamp connections. In this way, any number of filter capsules 12 can be joined together. The external connections 34 that are not required are sealed under controlled conditions by suitable closures 38. These closures 38 or even dummy caps are also attached by means of suitable connecting components 36. The inflow and outflow units 28 can be configured in one piece, as a kit or as a prefabricated unit. In particular, several inflow means 30 and/or outflow means 32 may be configured in one piece or can be pre-assembled before being attached to the filter capsules 12.

In particular in the design with several joined inflow means 30 and/or outflow means 32, which can also be referred to as series connection covers, numerous advantages over other line connections are obtained. In particular no or at least less large pipes 22 are necessary. The series connection covers permit the parallel flow to several filter capsules 12 and can be combined in any way with regard to the sizes and designs of the filter capsules 12. Overall, the series connection covers help the disposable filtration device 10 to achieve a more compact, smaller size, also because the support 14 may be smaller. Since fewer components are required when using series connection covers, the disposable filtration device 10 is thus overall more environmentally friendly.

In general, when several filter capsules 12 are used in a disposable filtration device 10, as shown for example in FIG. 6 or FIG. 7, it is possible to provide a central sterilizable air filter located at an upper external connection of the disposable filtration device 10 for the common venting of all or at least of a group of filter capsules 12. This means that the venting of several filter capsules 12 can be carried out bundled in only one place. The integrity of the assigned filter capsules 12 can also be tested together via the common air filter.

The draining of the filter capsules 12 can also be carried out centrally. A central collecting means can be arranged at the lowest point of all or of a group of filter capsules 12 for the common draining thereof.

In order to ensure optimum common venting or draining, the respective filter capsules 12 should be held in an upright position by the support 14.

With a view to providing a disposable filtration device 10 ready for connection which includes filter capsules 12 and allows a partially or fully automated filtration process to be carried out, in particular on a large scale, sensors for detecting specific process parameters and regulating means for setting specific process parameters may be provided. The sensors and regulating means are connected to an external monitoring and control system which is set up for evaluating and processing sensor data and for piloting the regulating means based on one or more control algorithms.

LIST OF REFERENCE NUMBERS

10 Disposable filtration device
12 Filter capsules
14 Support
16 Side wall
18 Transverse strut
20 Supporting means
22 Pipe
24 Branch
26 Foot
28 Inflow and outflow unit
30 Inflow means
32 Outflow means
34 External connection
36 Connecting component
38 Closure
40 Housing
42 Inflow connection
44 Outflow connection
46 First filter means
48 Second filter means
50 Core area of the first filter means
52 Core area of the second filter means
54 Filter medium of the first filter means
56 Filter medium of the second filter means
58 Barrier

The invention claimed is:

1. A disposable filter capsule for a filtration device, comprising:
   one single housing which has an inflow connection for a fluid to be filtered and an outflow connection for filtrate, and
   at least two filter cartridges firmly mounted within the housing and forming an inseparable structural unit together with the housing, the at least two filter cartridges being connected in series and arranged end-to-end in the housing with a first one of the at least two filter cartridges positioned above a second one of the at least two filter cartridges in an axial direction, each of the at least two filter cartridges having a hollow core area surrounded by a pleated filter medium and an outer area delimited on an inner side by the pleated filter medium and delimited on an outer side by the housing, the filter medium being a hydrophilic filter material, the outer areas of the at least two filter cartridges being fluidically separated from each other by a barrier,
   wherein the inflow connection is in direct flow connection with the outer area of the first one of the at least two filter cartridges,
   wherein the outflow connection is in direct flow connection with the core area of the second one of the at least two filter cartridges,
   wherein the core area of the first one of the at least two filter cartridges is in direct flow connection with the outer area of the second one of the at least two filter cartridges,
   wherein, in at least the second one of the at least two filter cartridges, the pleated filter medium comprises several layers,
   wherein the first one of the at least two filter cartridges is configured as a prefilter and the second one of the at least two filter cartridges is configured as a sterile filter
   wherein at least one vent valve is attached to each of the at least two filter cartridges,
   wherein all components of the disposable filter capsule consist of sterilizable materials; and
   wherein each of the at least two filter cartridges is integrity-testable individually.

2. The disposable filter capsule according to claim 1, characterized in that the inflow connection and the outflow connection are provided at opposite front ends of the housing.

3. The disposable filter capsule according to claim 1, characterized in that the at least two filter cartridges are substantially cylindrical.

4. The disposable filter capsule according to claim 1, characterized in that the outflow connection is in direct flow connection with the outer area of the second one of the at least two filter cartridges.

5. The disposable filter capsule according to claim 1, characterized in that the core areas of the at least two filter cartridges are in direct flow connection with each other.

6. The disposable filter capsule according to claim 1, characterized in that the at least two filter cartridges differ from each other with regard to at least one parameter characteristic of the at least two filter cartridges.

7. The disposable filter capsule according to claim 6, wherein the at least one parameter characteristic of the at least two filter cartridges includes a pore size.

8. A fully pre-sterilizable, integrity-testable disposable filtration device which is ready for connection, characterized by at least one disposable filter capsule according to claim 1.

9. The disposable filtration device according to claim 8, characterized by a central air filter for common venting of all or of a group of filter capsules.

10. The disposable filtration device according to claim 8, characterized by a central collecting means for draining of all or of a group of filter capsules.

11. The disposable filtration device according to claim 8, characterized in that a plurality of filter capsules are connected to each other by rigid lines and are firmly fastened in a grid universally predetermined by a support, the filter capsules being preconfigured in terms of at least one of filter type, design, or size.

12. The disposable filtration device according to claim 8, characterized in that a plurality of filter capsules are connected to each other by rigid lines and are firmly fastened in a grid universally predetermined by a support, the connections of joints of the filter capsules being preconfigured for a desired filtration process.

13. The disposable filtration device according to claim 8, wherein at least two filter capsules are connected in parallel, each filter capsule being provided with a separate inflow and outflow unit having an inflow means or an outflow means, the inflow means and the outflow means being either completely identical or at least largely identical in structure, the inflow means and the outflow means each having two opposite external connections, the inflow and outflow units being connected to each other under controlled conditions using connecting components.

14. The disposable filter capsule according to claim 1, wherein the inflow connection and the outflow connection are provided at opposite ends of the housing, wherein a proximal end of the first one of the at least two filter cartridges is connected to the inflow connection and a distal end of the second one of the at least two filter cartridges is connected to the outflow connection.

15. The disposable filter capsule according to claim 1, wherein the barrier is positioned between a distal end of the outer area of the first one of the at least two filter cartridges and a proximal end of the outer area of the second one of the at least two filter cartridges.

16. The disposable filter capsule according to claim 1, wherein, for an integrity test measurement and/or a pressure compensation, each of the at least two filter cartridges is configured to connect to an integrity test apparatus via a respective one of the at least one vent valve.

* * * * *